United States Patent [19]

Chevasson et al.

[11] Patent Number: 4,753,272
[45] Date of Patent: Jun. 28, 1988

[54] CONDUIT CLOSURE SYSTEM FOR CLOSING A CONDUIT HAVING A GRIPLESS INNER SURFACE

[75] Inventors: Alain Chevasson, Velizy-Villacoublay; Daniel Foucquart, Bonnelles, both of France

[73] Assignee: Societe Industrielle Pecquet, Tesson, Viroflay (Yvelines), France

[21] Appl. No.: 916,633

[22] Filed: Oct. 8, 1986

[30] Foreign Application Priority Data

Oct. 9, 1985 [FR] France ................... 85 14968

[51] Int. Cl.$^4$ ............................................. F16L 55/12
[52] U.S. Cl. ...................................... 138/93; 376/204
[58] Field of Search ............ 138/97, 93, 89, 90, 138/92; 220/232, 235–237; 166/192, 194, 195; 376/204, 203, 205

[56] References Cited

U.S. PATENT DOCUMENTS

| | | | |
|---|---|---|---|
| 2,064,569 | 12/1936 | Santucci | 220/236 |
| 2,800,242 | 7/1957 | Sauthoff | 220/235 |
| 3,479,831 | 11/1969 | Teague, Jr. | 405/170 |
| 4,518,015 | 5/1985 | Fischer | 138/93 |
| 4,548,783 | 10/1985 | Dalke et al. | 376/204 |
| 4,591,477 | 5/1986 | Rettew | 376/204 |
| 4,671,326 | 6/1987 | Wilhelm et al. | 138/93 |

FOREIGN PATENT DOCUMENTS 0014878 9/1980 European Pat. Off. .
826980 4/1938 France .

Primary Examiner—Mark J. Thronson
Assistant Examiner—L. J. Peters
Attorney, Agent, or Firm—Lowe, Price, LeBlanc, Becker & Shup

[57] ABSTRACT

A system is provided for closing a conduit having a gripless inner surface, comprising a sealing wall and an annular seal disposed between the wall and the conduit. Beams connected to the wall by adjustable tie-rods, disposed bearing against the inlet end of the conduit, support and immobilize said sealing wall.

3 Claims, 3 Drawing Sheets

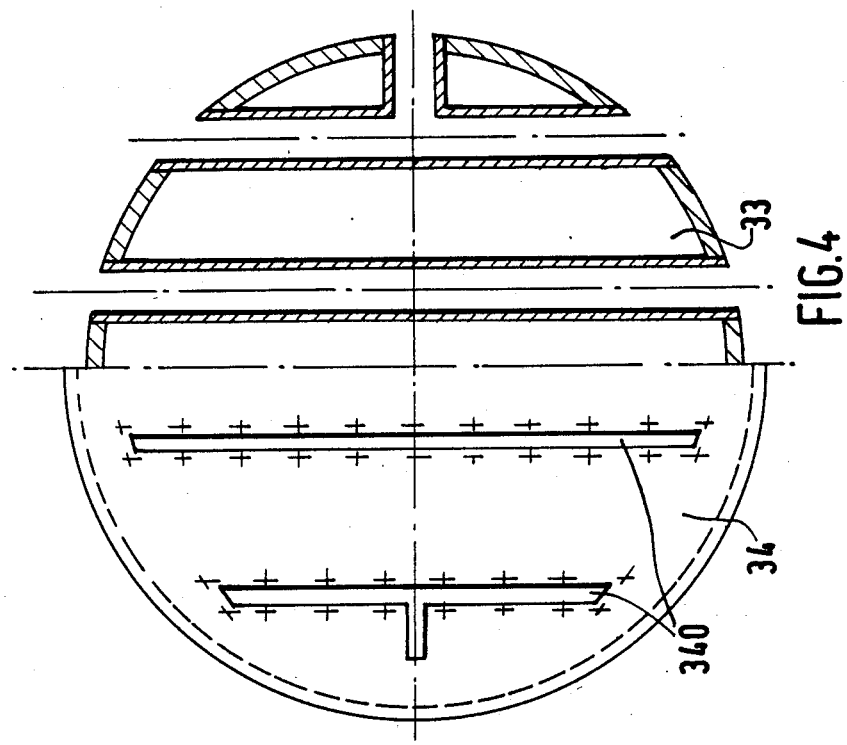
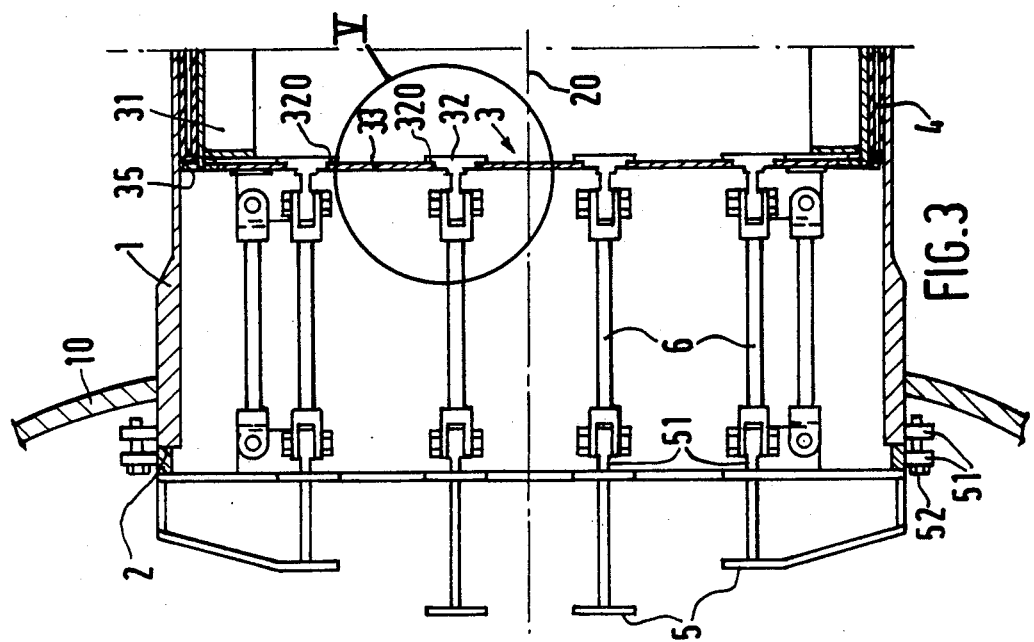

CONDUIT CLOSURE SYSTEM FOR CLOSING A CONDUIT HAVING A GRIPLESS INNER SURFACE

BACKGROUND OF THE INVENTION

1. Field of the Invention

The present invention relates to a system for closing a conduit having a gripless inner surface, which is to be tested under pressure from an open inlet end.

Such a system is useful, for example, for periodic testing, by application of an overpressure, of the resistance of steam driers-superheaters in nuclear power stations. In fact, for carrying out an overpressure resistance test of such an apparatus, it is necessary to close the whole of the conduit which opens into this apparatus and in particular the conduit which in normal use brings the steam into the apparatus. Since it is important to check, at the same time, the pressure resistance of the connection between the drier-superheater and this conduit, the closure must be provided in the conduit beyond this connection, which corresponds therefore substantially to the open end of the conduit allowing the input of pressurized fluid during testing. In most cases, there is no grip on the inner surface of the conduit, which is therefore generally smooth coming straight from the braziery.

2. Description of the Prior Art

To close a conduit with a smooth inner surface, it is known to use a closure system formed essentially of an inflatable envelope, made for example from rubber, of a substantially cylindrical shape when it is inflated, and whose wall bears on the smooth inner surface of the conduit, under the effect of the pressure of a fluid with which the envelope is inflated. Sealing rings are generally formed on the outside of the walls of the envelope in contact with the inner surface of the conduit, so as to provide good sealing. Although such a system gives satisfaction in the case of a conduit of moderate diameter subjected to a pressure difference also moderate, it is unusable in the above described application, relating to pressure testing of a drier-superheater. In fact, in this case, the diameter of the conduit to be closed is generally of the order of 1.20 m and the testing pressure of the order of 20 bars. Now, in the case of a conduit of a diameter of 1.20 m, the maximum admitted pressure difference for an envelope of the above type is of the order of 0.3 bar. For higher pressure differences, adhesion of the envelope to the inner surface of the conduit is no longer ensured, and such an envelope cannot then be suitable for solving the problem raised.

For this, a sealing wall could be placed inside the conduit, an annular seal possibly inflatable being placed between the two. This would require the fitting of fixing means to the inner surface of the conduit, so as to maintain the wall in position before testing and immobilizing it so that it does not move under the action of the forces exerted on the wall during testing. Now, for questions of safety, it is not tolerable to take the risk of damaging the inner surface of the conduit, which must remain in its initial condition during and after testing. Moreover, a closure wall dimensioned so as to resist and not be deformed under the action of such stresses would be very heavy and so difficult to install inside the conduit, in a position difficult of access for remote from the inlet end.

The present invention aims at overcoming the above drawbacks by providing a closure system for a conduit having an inner gripless surface system which is capable of withstanding very high pressures in large diameter conduits, which requires the installation of no fixing means on the inner surface of the conduit and which is easy to position.

SUMMARY OF THE INVENTION

For this, the present invention has as object a closure system for a conduit having an inner gripless surface to be tested under pressure from one open inlet end, which system includes a sealed wall disposed inside the conduit, at a distance from the inlet end, for closing the conduit, an annular seal disposed between the wall and the inner surface of the conduit, means separated from the wall and connected thereto by connecting means for supporting it and preventing it from being deformed under the action of the pressure, disposed on the outside of the conduit, before its inlet end.

In the system of the invention, the means for supporting the sealing wall, which make this latter capable of withstanding high pressures, being placed outside the conduit before its inlet end, it is easy to hold them in position before testing and to immobilize them during testing without damaging the inner surface of the conduit. Since the sealing wall in itself, separated from the supporting means, may be dimensioned so as to be relatively light, it is easy to install inside the conduit.

Advantageously, the sealing wall is demountable.

Thus, in the case of driers-superheaters where the inside of the conduit to be closed is only accessible by an operator who has passed through a manhole of reduced diameter, it is sufficient to provide elements forming the sealing wall manipulable by hand for using the system of the invention.

In the preferred embodiment of the system of the invention, the inlet end of the conduit is in a cross sectional plane of the conduit and the means for supporting the wall are support beams disposed parallel to this plane, bearing on the inlet end.

In this case, the force exerted on the sealing wall by the testing pressure, during testing, is transferred through the connecting means and the supporting beams to the end of the conduit itself. In general, this latter is fairly resistant so that there is no need to provide other immobilization means during testing.

The annular seal may be an inflatable seal.

Thus possible variations of the annular gap separating the wall from the inner surface of the conduit may be accomodated without difficulty during inflation of the seal.

BRIEF DESCRIPTION OF THE DRAWINGS

The present invention will be better understood from the following description of several embodiments of the system of the invention, with reference to the accompanying drawings in which:

FIG. 3 shows a top view in section through line III—III of the system of FIG. 1, during mounting, FIG. 4 shows, in its right-hand half, a partial front view of the plates in the mounted position on the sealing wall of FIG. 2 and in its left-hand half a partial front view of the sealing sheet in this assembled position on the sealing wall of FIG. 2.

DESCRIPTION OF THE PREFERRED EMBODIMENTS

Figure 1:
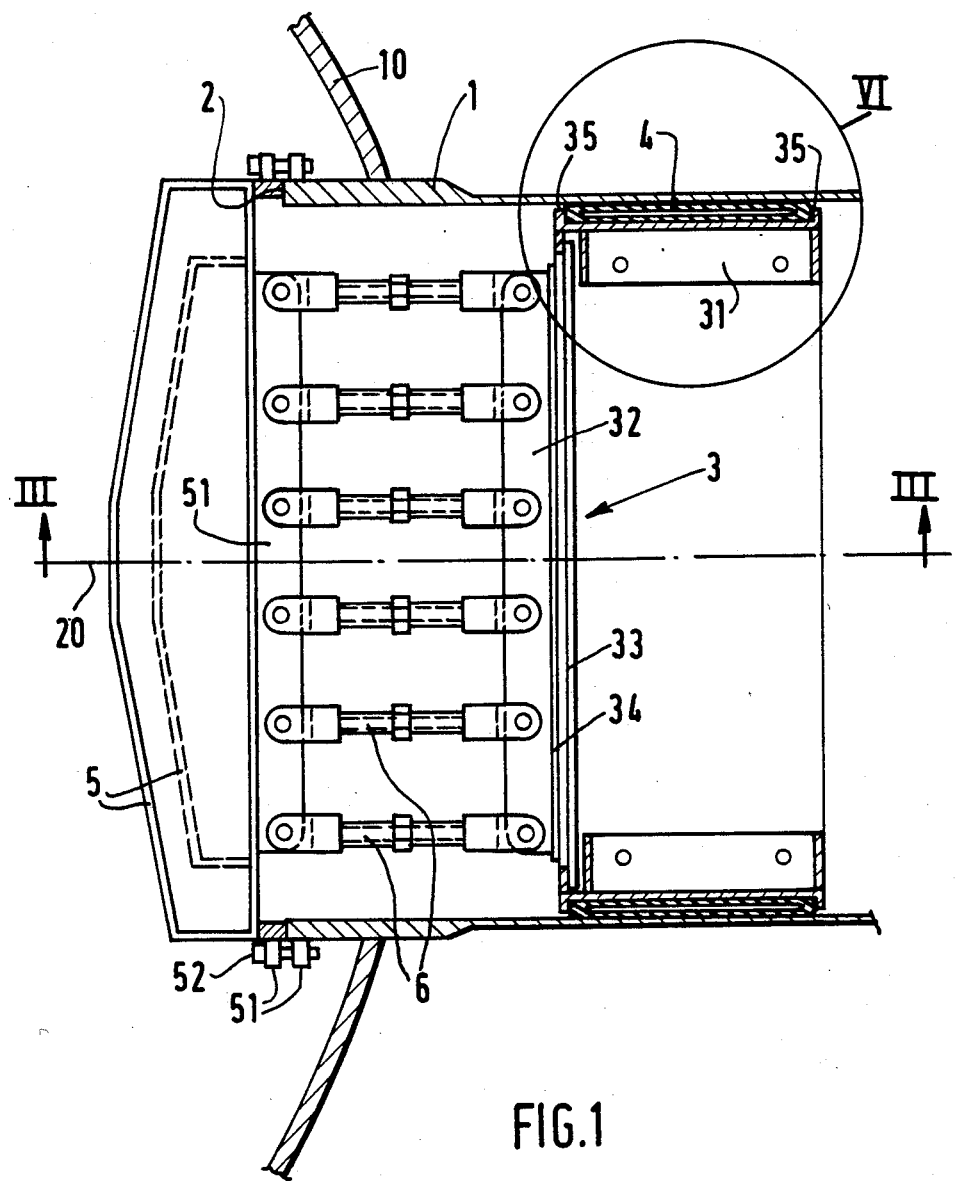
FIG. 1 shows a side view in section of a closure system.

The closure system which will now be described is used here for periodically testing the pressure resistance of a nuclear power station steam drier-superheater, and of a part of a steam intake conduit connected to this apparatus.

In FIGS. 1 to 4, only the parts 10 of the drier -superheater connected to conduit 1 with axis 20, to be closed, are shown. The inner surface of conduit 1 is smooth and offers no grip. Conduit 1 is in communication with the drier-superheater by its open inlet end 2.

A sealing wall 3 is disposed inside conduit 1 at a distance from the inlet end 2. It includes a rigid cylindrical girdle 31, an assembly of bars 32 mounted on girdle 31 and forming therewith a rigid frame on which an assembly of plates 33 is mounted so as to form a continuous wall.

The rigid cylindrical girdle 31 of the sealing wall 3 is here demountable and includes an assembly of elements substantially in the form of an arc of a circle, assembled together by known means such for example as nuts and bolts. The cylindrical girdle 31 is dimensioned so that it fits, with a small clearance, in the cross section of conduit 1, the gap between the two being filled, as shown in FIGS. 1 and 3, by a hollow annular seal 4, here of elongate section parallel to the axis 20 of conduit 1. The hollow annular seal 4 is inflatable by means not shown because they are conventional. Collars 35, projecting with respect to the cylindrical girdle 31, serve for precentering the system in the pipe and immobilize the annular seal 4 in directions parallel to the axis 20 of conduit 1.

The bars 32, whose section is in the form of a T, are mounted on the girdle 31 so that their end parts corresponding to the cross-piece of the T are held in contact with the girdle 31 by known assembly means, the parts corresponding to the shank of the T being turned towards the inlet end 2 of conduit 1.

Figure 2:
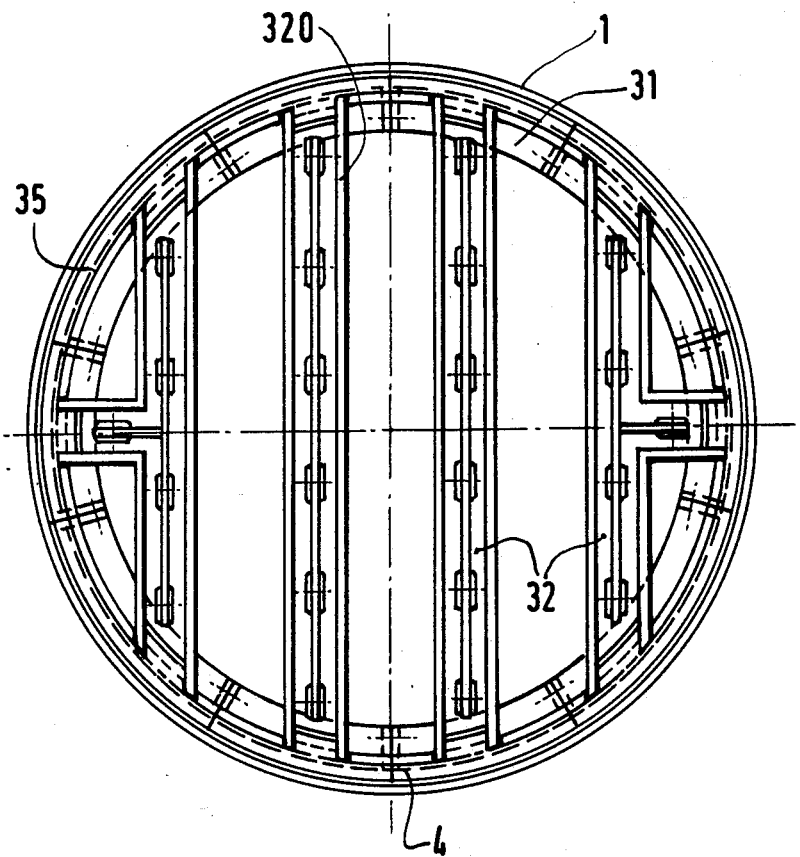
FIG. 2 shows a front view of the sealing wall of the system of FIG. 1, during mounting.

The parts of bars 32 corresponding to the cross-piece of the T and turned towards the inlet end 2 of conduit 1 include recesses 320 adapted for receiving the plates 33, here made from metal. FIG. 2 shows the wall 3 during mounting, before fitting of plates 33, partly shown in their mounted position in the right-hand half of FIG. 4. In this figure, the hatched zones of plates 33 correspond to the zones bearing on the recesses 320.

After fitting of the plates, in the condition shown in FIG. 3, a deformable sheet 34, here made from rubber, is positioned.

Figure 5:
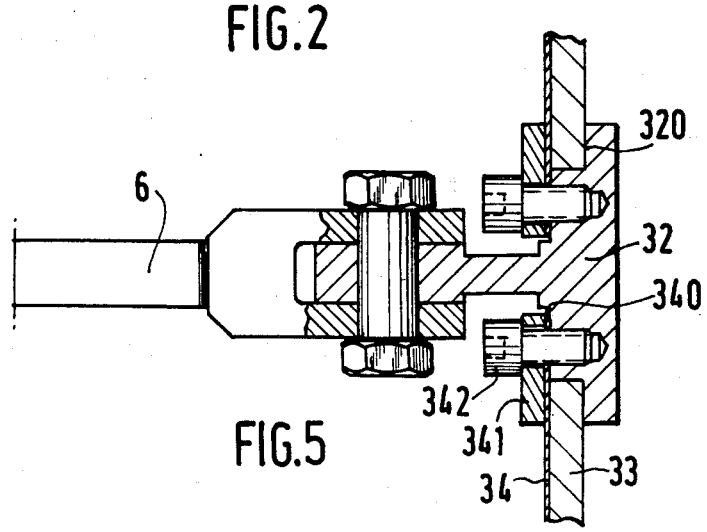
FIG. 5 shows an enlargement of detail V of FIG. 3.

In sheet 34 openings 340 are formed for clearing the parts of the bars 32 corresponding to the shank of the T, projecting towards the inlet end 2 of conduit 1. Sheet 34, shown partially in the left-hand half of FIG. 4, is thus applied to the flat parts of the sealing wall 3 so as to ensure good sealing thereof. Sheet 34, as well as plates 33, are held in position by known means, here retaining plates 341 and screws 342, as is shown in FIG. 5.

The projecting parts, corresponding to the shank of the T of the bars 32 are connected in a way known per se to adjustable tie-rods 6, also of known type, and these tie-rods 6 are connected to support beams 5, disposed here parallel to the cross-sectional plane of conduit 1 which coincides with its inlet end 2 and bearing thereon.

Beams 5 are held in position at the inlet end 2 by known means, here lugs 51 connected by screws 52, shown in FIGS. 1 and 3.

The support beams 5 are disposed parallel to bars 32 so as to simplify the arrangement of the adjustable tie-rods 6. Here, as is shown in FIG. 3, beams 5 have a substantially H section, a part 51 extending the central cross-piece of the H projecting towards wall 3 and connected to the adjustable tie-rods 6.

Conventionally, the support beams 5 have the general shape of a rocking lever, i.e. their section is wider at the center than at the ends bearing against the inlet end 2, which lightens the weight thereof.

The system which has just been described functions as follows. The inflatable seal 4 is inflated after positioning thereof and of the sealing wall 3, facilitated by the fact that the sealing wall 3, whose installation inside the conduit and at a distance from the inlet end 2 is relatively delicate, is relatively light since it has been dimensioned taking into account the fact that it is supported, during pressure resistance testing by the support beams 5. For pressure resistance testing, water is fed into the drier-superheater at a pressure of 20 bars. Because the gap between the sealing wall 3 and the inner surface of conduit 1 is small, the inflatable seal 4 may withstand such a pressure. The sealing of wall 3 is provided by sheet 34 which, under the action of the water pressure is applied against bars 32 and plates 33. Finally, the forces resulting from the pressure applied to wall 3 are transferred, through the tie-rods 6, to the support beams 5 which prevent the wall 3 from being deformed and immobilize it in the position in which it was mounted. The support beams 5 bear against the inlet end 2 of conduit 1, the resultant of the forces due to the testing pressure being applied in the direction of axis 20. Thus, the lugs 51 and screws 52 are subjected to no force related to the test pressure and may be dimensioned solely for holding the support beams 5 in position before testing the test pressure is applied from the left hand side of the sealing wall 3.

When the test is finished, the assembly may be disassembled, and the walls 10 of the drier-superheater, as well as the inner surface of conduit 1 are intact, free of any damage related to the testing, except for lugs 51 which, considering their position inside the drier enclosure and their small dimensions, related to the fact that they are only useful for positioning, are not troublesome.

In the situation which has just been described, the fact is used that the conduit 1 has an inlet end 2 which advances inside the drier enclosure and which corresponds to a cross-sectional plane of the conduit. This is particularly convenient so that the support beams 5 bear against this inlet end 2 during pressure resistance testing. This is however not obligatory and, in different situations, where it is not possible to make use of such an advantage, the system of the invention remains still advantageous, to the extent that the means for supporting and immobilizing the sealing wall, which means are necessarily heavy and which must be firmly fixed, are placed outside the conduit, so in a larger volume than that of the conduit, where it will always be easy for a man skilled in that art to find gripping means for immobilizing these support means.

Figure 6B:
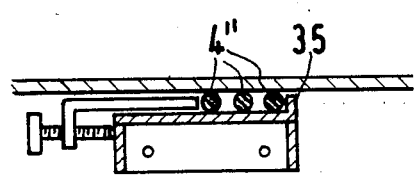
FIG. 6 shows the detail VI of FIG. 1 in two further varying embodiments.
Figure 6A:
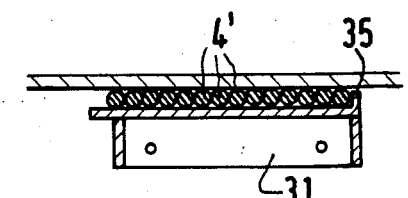

In the embodiment which has just been described, an inflatable seal 4 has been used which has the advantage of being able to compensate for the possible variation of the annular gap separating the sealing wall 3 from the inner surface of conduit 1. This is not obligatory and in a variant of construction illustrated in FIG. 6a, an assembly of O seals 4' has been used, held in position by a single collar 35 and able to be deformed under the effect of the pressure, so as to provide a satisfactory seal. In another variant of construction illustrated in FIG. 6b, an assembly of O seals 4" is compressed, before application of pressure, by means of a known packing system.

These O seals 4' and 4" may be replaced by any other type of seal, for example by braided packing.

The system of the invention may obviously be used for testing pressure or overpressure resistance behavior of any type of apparatus with opening pipe, coming straight from the braziery or machined, using any fluid, liquid or gaseous.

What is claimed is:

1. A closure system for a conduit having two sides, one being an outside outer wall surface and the other a substantially parallel, inside inner wall surface, and an end wall substantially perpendicular to said outer and inner wall surfaces, said inner wall having an open inlet end for testing under pressure said open inlet end, comprising a single sealing wall means disposed inside the conduit spaced from the inlet end for closing the conduit; an annular seal disposed between the sealing wall means and the inner surface of the conduit; support means disposed outside the conduit open inlet end and bearing against the outer wall of the conduit and connecting means rigidly connecting said sealing wall means with said support means said support means including a plurality of longitudinal beams, two ends to each beam, extending generally parallel with said sealing wall means and each beam having its ends proximate the end wall of the inlet end, wherein forces resulting from a testing pressure applied to the sealing wall means are transferred through the connecting means to the support means to prevent the sealing wall means from being deformed and so that the resultant of the forces due to the testing pressure are applied against the inlet end of the conduit by the support means in a direction parallel to the longitudinal axis of the conduit, directed into the conduit.

2. The closure system as claimed in claim 1, wherein said sealing wall means has a rigid cylindrical girdle adapted for supporting the annular seal, an assembly of bars mounted on said girdle, and a wall formed with an assembly of plates mounted on the bars and the girdle and means for sealing the wall.

3. The closure system as claimed in claim 1, said sealing wall means being parallel with said inlet end, said supporting means including beams extending parallel with said sealing wall means and bearing against said inlet end of the conduit and said connecting means includes a plurality of parallel adjustable tie-rods.

* * * * *